(12) United States Patent
Sandborn et al.

(10) Patent No.: US 7,150,473 B2
(45) Date of Patent: Dec. 19, 2006

(54) COUPLING DEVICE COMPRISING A LEAKAGE GROOVE

(75) Inventors: Mats Sandborn, Partille (SE); Stefan Eriksson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/709,586

(22) Filed: May 15, 2004

(65) Prior Publication Data
US 2005/0017504 A1 Jan. 27, 2005

Related U.S. Application Data

(63) Continuation of application No. PCT/SE02/02046, filed on Nov. 11, 2002, now abandoned.

(30) Foreign Application Priority Data
Nov. 15, 2001 (SE) .................................... 0103798

(51) Int. Cl.
F16L 55/00 (2006.01)
(52) U.S. Cl. ........................... 285/14; 285/93; 285/924
(58) Field of Classification Search ................. 285/13, 285/14, 345, 346, 924, 93; 277/608, 613
See application file for complete search history.

(56) References Cited

U.S. PATENT DOCUMENTS

| | | | |
|---|---|---|---|
| 4,361,380 A * | 11/1982 | Marazzi | 285/924 |
| 6,027,143 A * | 2/2000 | Berg et al. | 285/93 |
| 6,027,144 A * | 2/2000 | Hagen et al. | 285/93 |
| 6,095,570 A * | 8/2000 | Hagen et al. | 285/93 |
| 6,286,877 B1 * | 9/2001 | Mendoza et al. | 285/924 |

FOREIGN PATENT DOCUMENTS

| | | |
|---|---|---|
| EP | 0766033 A1 | 4/1997 |
| EP | 0795102 B1 | 8/2000 |
| SE | 459279 B | 6/1989 |
| WO | WO 9713094 A1 | 4/1997 |

* cited by examiner

*Primary Examiner*—Aaron Dunwoody
(74) *Attorney, Agent, or Firm*—Novak Druce & Quigg, LLP

(57) ABSTRACT

Method and arrangement for providing a coupling device for conduits of pressurized media which consists of (includes) at least two coupling parts (1, 2) that are possible to couple to each other in the shape of a female part and a male part which is insertable into the female part. A locking device is arranged to hold the coupling parts completely coupled in a locking position. The locking device comprises a locking member (11) positioned at one of the coupling parts (2) which in a locking position attaches into a recess (12) in the other coupling part. A sealing member (6) in the locking position achieves sealing between the coupling parts. The other coupling part (1) exhibits a further recess (16) in which the locking member can be brought to locking of the coupling parts (1, 2) in an outer locking position when the two coupling parts are coupled to each other. In the outer locking position there is incomplete sealing with the two coupling parts being locked so that they are prevented from coming apart but are incompletely coupled together and allowed to be brought together to said locking position for the complete coupling of the coupling parts. In the presence of pressurized media, this enables an indication that the outer locking position has been assumed due to the presence of leakage of pressurized media. The leakage is obtained via a leakage groove (20) which is angled towards the radial plane of the coupling parts. The leakage groove can thus be made by means of rotating machining.

8 Claims, 3 Drawing Sheets

COUPLING DEVICE COMPRISING A LEAKAGE GROOVE

CROSS-REFERENCE TO RELATED APPLICATION:

The present application is a continuation patent application of International Application No. PCT/SE02/02046 filed 11 Nov. 2002 now abandoned which was published in English pursuant to Article 21 (2) of the Patent Cooperation Treaty, and which claims priority to Swedish Application No. 0103798-5 filed 15 Nov. 2001. Both applications are expressly incorporated herein by reference in their entireties.

TECHNICAL FIELD

The present invention relates to methods and arrangements for providing coupling device in conduits utilized for conveying pressurized media.

BACKGROUND ART

Simpler coupling devices for pressurized media conduits exhibit a disadvantage in that an incomplete coupling of the comprised coupling parts can lead to a fall in pressure during operation due to the coupling parts coming apart.

In such couplings, it has proven to be difficult to find such coupling errors during controls, which can cause a large risk of accidents due to, for example, loss of breaking function in braking systems which are actuated by pressurized air.

For systems with pressurized media with special safety demands, there are known coupling devices which are arranged to leak pressurized media in an incomplete locking position. In so doing, an acoustic indicating signal is generated at the same time as the coupling is stopped from separating entirely, due to which a loss of pressure is delayed (See EP 0795 102 B1 and SE 459 279 B as examples thereof). In these known couplings, the leakage point forms a beveling in the end of one of the coupling parts which effects the placement of an interacting sealing ring.

DISCLOSURE OF INVENTION

An object of the present invention is to achieve a coupling device in which the leakage point is created using simple means. This objective is obtained by means of utilization of the present invention.

The invention can take the form of a method or an arrangement for providing a coupling device in a conduit utilized for conveying pressurized media, and which includes two coupling parts which can be coupled to each other in the form of (1) a female part and (2) a male part which is insertable into the female part. A locking device is arranged to allow coupling of the male part with the female part and to, in an inner locking position, hold the coupling parts completely coupled together. The locking device comprises (includes, but is not limited to) at least one locking member at one of the coupling parts that is arranged to, in the locking position, attach into a recess in the other coupling part with one or several sealing members that are arranged to, in the locking position, achieve sealing between the coupling parts. The second coupling part exhibits a further recess in which the locking member is brought to locking of the coupling parts in an outer locking position at the coupling of the two coupling parts with each other. In the outer locking position, an incomplete sealing is present and the two coupling parts are locked and incompletely coupled together so that they are prevented from coming apart, but are allowed to be further brought together to the inner locking position for a complete coupling of the coupling parts. In this manner, in the presence of a pressurized media, an indication can be obtained that the outer locking position has been assumed due to the presence of leakage of pressurized media.

MODE FOR THE INVENTION

Figure 1:
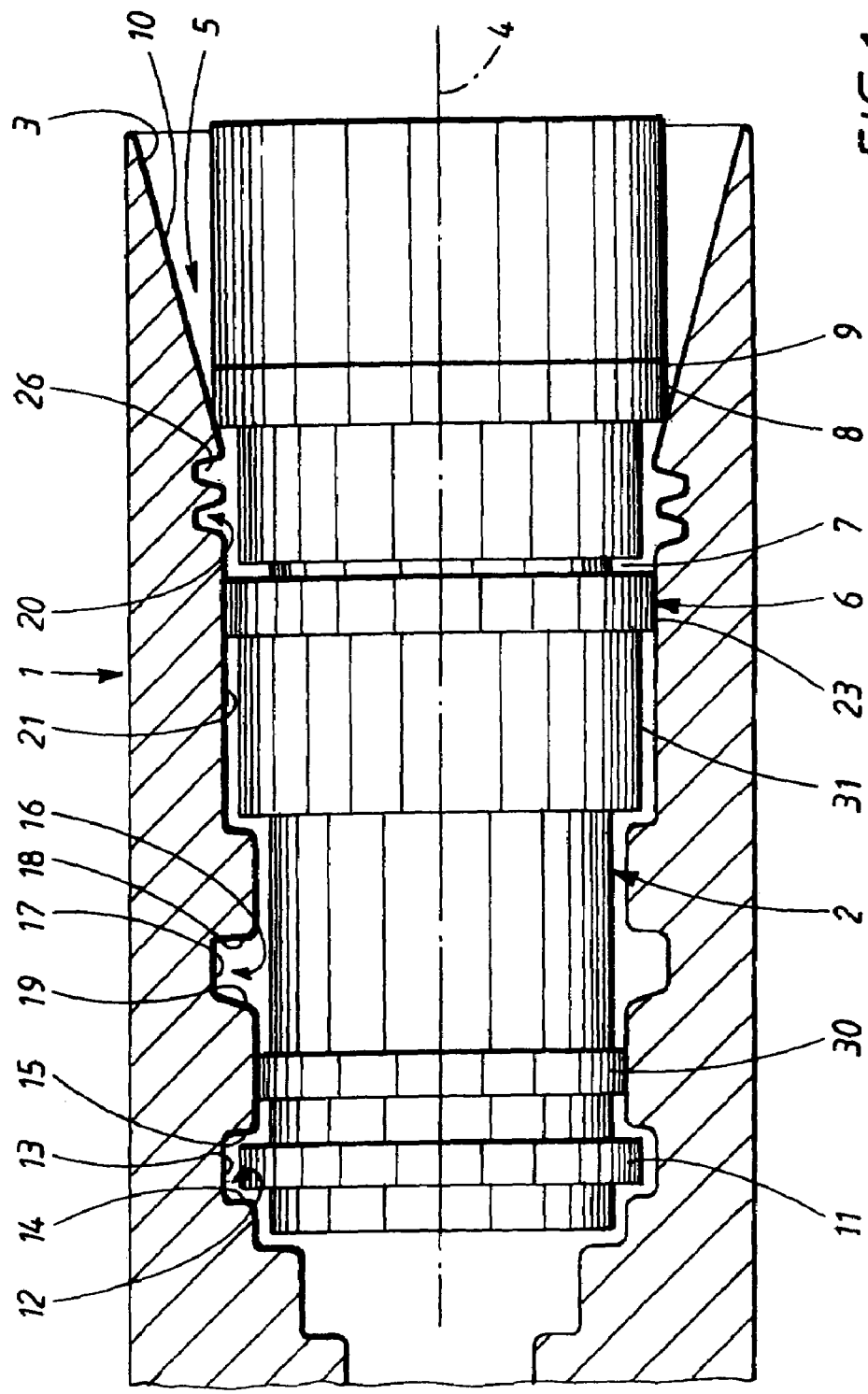
FIG. 1 is a partially cutaway side-view of the coupling device configured according to the teachings of the present invention in a completely coupled state.

In the following, the invention will be described utilizing an exemplary embodiment in which like reference numerals are employed to indicate corresponding parts.

As may best be appreciated in FIG. 1, the coupling device includes two coupling parts, for example for coupling one part (for example a pipe for a pressurized media, pressurized air or the like) to a fixed part of a pressurized media system (for example, a not shown pressurized container. The two main parts of the coupling device in the example shown consist of a first coupling part 1, which includes a coupling end (though not shown) for attachment to, for example, the wall of the container or another fixed part of the pressurized system and a second coupling part for example for the attachment of a pressurized media pipe. The coupling device, with its two coupling parts 1, 2, achieves a coupling between two parts of a pressurized system. The first coupling part 1 is shaped as a female part or a casing part with a circular opening 3, which axially inwards becomes an essentially cylindrical passage 5 being rotationally symmetrical about the longitudinal axis 4 of the coupling device. The second coupling part 2 is designed as a male or an insertion part dimensioned to be inserted into the open end 3 of the female part. The coupling device is provided with sealing elements in order to achieve a coupling between coupling parts which is protected from dirt and sealed against pressure. The coupling parts mainly consist of an inner sealing ring 6 which is placed in a ring-shaped groove 7 in the male part 2. The sealing ring 6 consists of an elastic O-ring sealing made in an elastic material such as rubber or plastic. In the example shown, an additional sealing element 8 is fitted on to the male part 2 and is in contact with a stopping abutment 9 on the male part. This sealing primarily forms a protection against dirt and dust and is intended to be in sealing contact with a conical wall 10 at the open end 3 of the female part. This sealing element 8 is also thus ring-shaped, and preferably made of an elastic material such as rubber or plastic.

The sealing elements 6, 8 can, for example, have an essentially rectangular cross-section, or alternatively exhibit circular or oval cross-section shapes and extend around the outwards facing casing surface 31 of the male part 2.

The coupling device, according to the invention, exhibits a locking device which is intended to lockingly hold two coupling parts to each other in a coupled state. The locking device exhibits at least one locking member 11 which is elastic in order to constantly attempt to assume the locking position. In the example shown, the locking member consists of a radially outwards elastic locking ring. The locking ring 11 is to be positioned in a recess in the male part so that it is essentially axially locked to the male part 2 or at least has a severely limited axial mobility towards the male part. In the locking device, a first ring-shaped locking groove 12 is included in the female part and in which the locking ring is arranged to flex inwards into a first inner locking position. The locking groove 12 has a ring-shaped bottom surface 13 which, for example, has a cylinder shaped surface and two contact surfaces 14, 15 which extend in parallel to each other and extend in one radial plane each relative to the longitudinal axis 4 of the female part. In the locking device, there is also comprised a second outer locking groove 16 in the female part 1. This locking groove also has a ring-shaped bottom surface 17 which, for example, has a cylindrically shaped casing and a contact surface 18 axially turned inwards in the female part which extends in a radial plane. The opposite surface 19 of the track 16 is however oblique relative to a radial plane; that is to say, forms a conical surface so that the locking ring 11, when the male part 2 is inserted into the female part, is pressed radially inwards towards its elastic action in order to enable the male part to be pressed further inwards to its full locking position.

In principle, the locking device can function with one single locking ring 11 which in the inner position interacts with the inner locking groove 12, and in the outer locking position interacts with the outer locking groove 16. In order to further raise the safety, the locking device in the example shown is provided with a second, or outer locking ring 30 that is arranged on the male part 2 axially outside of the first locking ring 11 at a distance from it which is smaller than the axial distance between the locking grooves 12, 16; that is, it is in a completely coupled state positioned axially between the looking grooves 12, 16. In an incompletely locked position, for example when the male part 2 has not been inserted so that the locking ring 11 grips into the locking groove 12, the outer locking groove 16 will catch the outer locking ring 30 so that it is in locking contact with the outer locking groove 16. Additional safety is also obtained if one of the locking rings 11, 30 should malfunction.

The coupling device, in a known manner, is arranged to leak pressurized media in the outer coupling position, and thereby indicate that there is an incomplete coupling. In the case of pressurized air, the indication is in the form of an acoustic signal, usually a hissing sound.

The indication is obtained, according to the invention, by means of a leakage groove 20 in that coupling part which does not support the sealing member 6; in the example shown, the female part 1. The leakage groove 20 in the illustrated example is arranged in a sealing portion 21 of the female part 1; i.e., a portion which seals, pressure-proof, due to interaction with the sealing ring 6. This portion 21 is in similarity to the sealing ring 6 rotationally symmetrical about the longitudinal axis 4, and extends axially mainly inside of the leakage groove 20 and with a diameter which corresponds to the outer diameter of the sealing ring 16 in the sealing position. That is, in the total locking position according to FIG. 1 with the elastic sealing ring slightly compressed. The elasticity is, however, designed to withstand the pressure from the pressure media and such that a rolling and undesired deformation does not arise during axial coupling movements. In the example shown, the sealing portion 21 of the female part 1 has a cylindrically shaped casing surface, and terminates at the axially outer end at the leakage groove.

Figure 3:
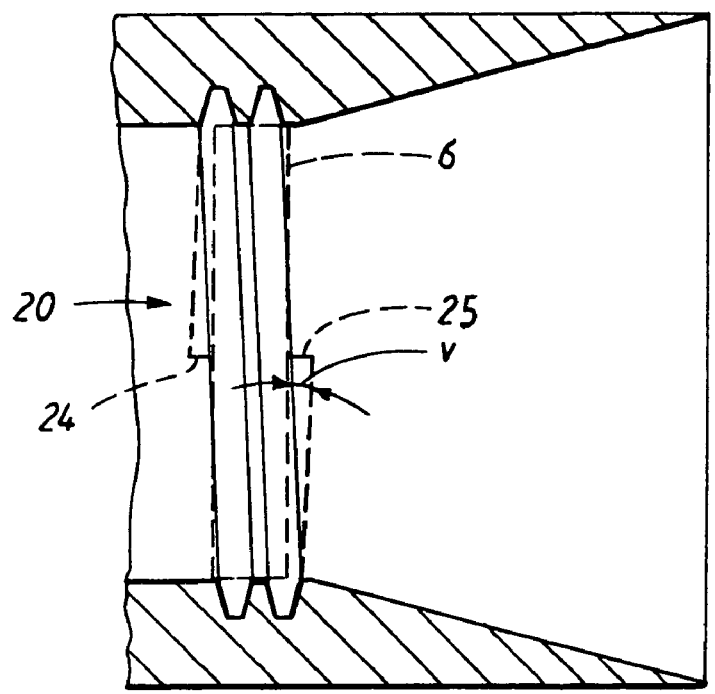
FIG. 3 shows a detailed schematic view of a coupling device showing a leakage groove of the invention as a spiral groove.

The leakage groove 20, hereafter referred to as the leak groove, exemplarily includes an axial extension that exceeds the axial extension of the active sealing surface 23 of the inner sealing ring 6, which in the illustrated example is essentially cylindrically shaped. In addition, the extension of the leak groove has an acute angle (labeled "v") towards the radial plane of the female part 1, and extends in a screw or spiral shape along the sealing surface 21 of the female part as depicted in FIG. 3.

Figure 2:
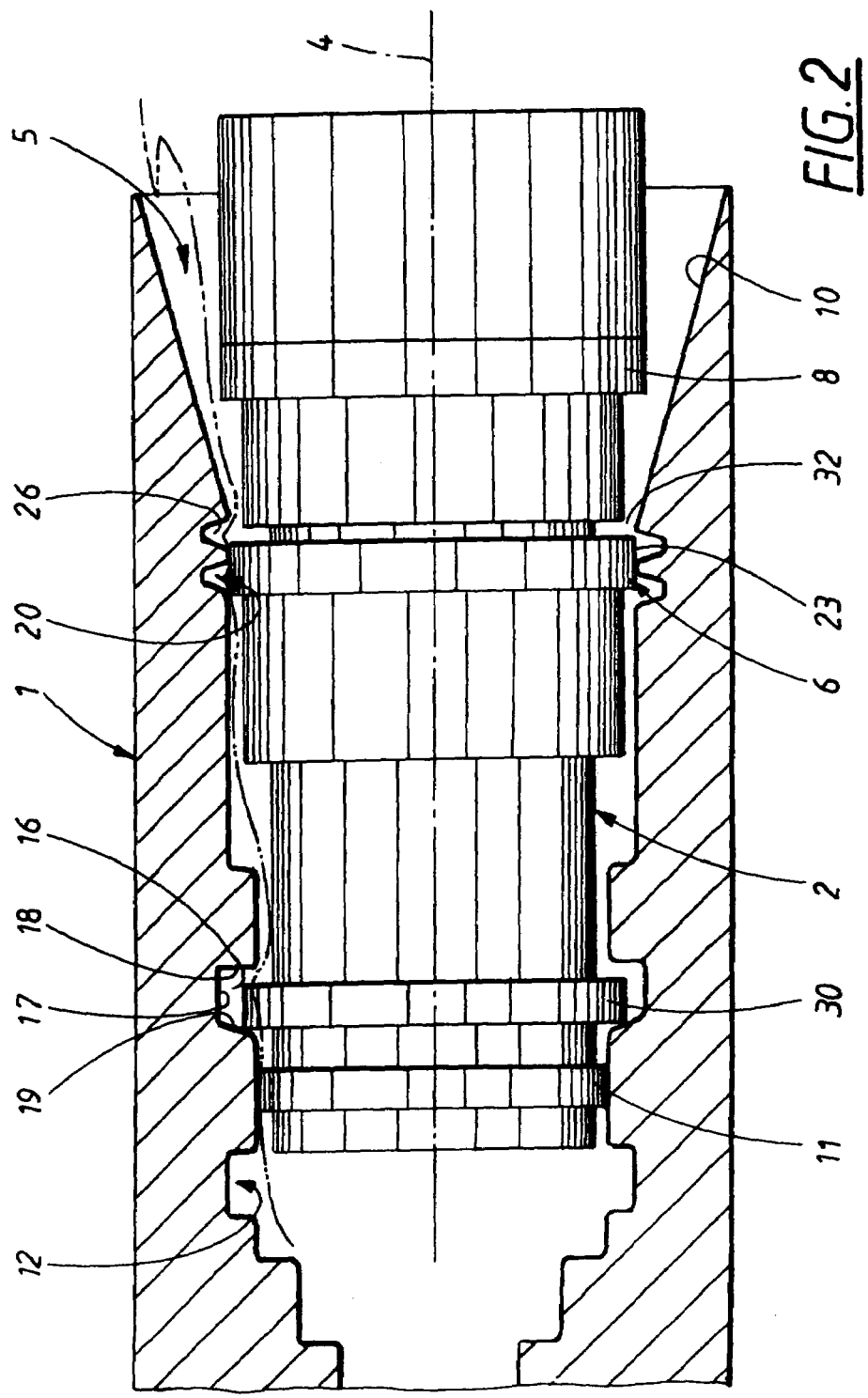
FIG. 2 shows a partially cutaway view corresponding to the view of FIG. 1, but the coupling device is in an incompletely coupled state.

In the example shown, the leak groove extends at least two circles (revolutions) and begins with an inner groove end 24 and terminates in an outer groove end 25. As can be appreciated in FIGS. 2 and 3, the positioning of the leak groove 20 is located relative to the position of the sealing ring 6 in the incompletely locked or incompletely coupled position that the inner groove end 24 extends axially inside of the active sealing surface 23 of the sealing ring 6, while the outer groove end 25 extends axially outside of this surface. Furthermore, the width of a single groove portion 26 is suitably smaller than the width of the surface 23 of the sealing ring 6 and the elasticity is so chosen that the sealing ring does not completely fill the leak groove in any portion. Under these circumstances, the leak groove 20 forms a free passage for leakage of pressure media in the incompletely coupled or locked position according to FIGS. 2 and 3, by means of which an indication is obtained in the case of air or other gas in the shape of an acoustic signal such as a hissing or "squeaking" sound. The outer sealing ring 8 in this case also provides free passage via a ring shaped gap 32 which is formed between the ring and the conical wall 10 of the female part 1 in the outer locked position.

In the completely coupled or locked position according to FIG. 1, the sealing ring 6 is positioned axially inside the leak groove 20 and is in sealing contact with the sealing surface 21 of the male part 2. The outer sealing ring 8 is positioned axially outside of the leak groove 20, and is in the inner locking position in sealing contact, thus constituting a barrier against dirt against the conical wall 10 of the male part.

Figure 4:
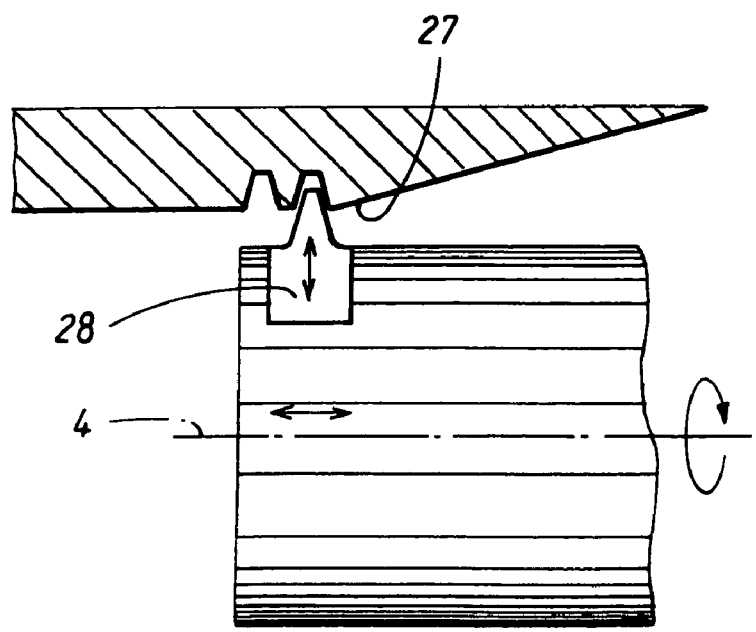
FIG. 4 is a schematic view illustrating a method for milling a leakage groove in a portion of a coupling device of the present invention.

By means of the acute angle (v) of the leak groove 20 and its screw spiral shape, it is made possible for the groove to be rationally manufactured by means of rotating machining, together with manufacture of at least some surfaces of the coupling part which is to be provided with the leak groove, for example the conical wall 10 of the female part 1 or its entire inner cavity surface. In FIG. 4, it is schematically shown how the form of the inner surface 27 is made by, for example, rotation of the male part 2 about its longitudinal axis 4 with a milling tool 28 working on the inner surface during a combined movement axially and radially in order to remove material in the surface and thus mill the leak groove from its one end to its other end. The relative rotational speed and the axial speed of movement and the radial movement of the tool and the material; i.e., the male part are hereby synchronized during the milling of the leak groove 20 so that the desired extension is obtained, for example, the slope with the angle (v). The groove can have a depth which successively becomes smaller towards the ends or terminates relatively abruptly whichever is suitable from a production point of view. By means of a pre-programmed machine, the groove can be made in one and the same manufacturing moment as the conical wall or the rest of the cavity.

The invention is not limited to the above-described examples and the exemplary embodiments shown in the drawings, but can be varied and still remain within the scope of the patented claims. It is, for example, possible to use only a single locking ring or a single sealing ring. In the example shown, the pressurized media is exemplified as air, but the use of other pressurable media is also contemplated, such as other gases or pressurized fluids like hydraulic oil. This makes the indication of leakage ocularly observable unless the leakage of fluid can give an acoustic indication.

In addition, it is possible to replace the locking rings with other locking elements which in a corresponding manner can be switched between a locking position and a releasing position. In addition, the locking rings, locking grooves, sealing rings and also the leak grooves can change places so that they are positioned in the male part instead of in the female part, and vice versa.

The invention claimed is:

1. A coupling device for conduits of pressurized media, said coupling device comprising: two coupling parts, each having a casing surface, couplable together as a female part (1) and a male part (2) which is insertable into the female part; a locking device arranged to allow coupling of the male part with the female part and to, in an inner locking position, hold the coupling parts coupled together, the locking device comprises at least one locking member at one of the coupling parts that is arranged to, in said locking position, attach into a recess in the other coupling part with one or several sealing members being arranged to, in said locking position, achieve sealing engagement between the coupling parts, with the second coupling part having a further recess in which said locking member is brought into locking engagement of the coupling parts in an outer locking position at the coupling of the two coupling parts with each other, and in which outer locking position an incomplete sealing is achieved and in which the two coupling parts are locked and incompletely coupled together and thereby being prevented from coming apart and being allowed to be brought together to said inner locking position for a complete coupling of the coupling parts by means of which, in the presence of a pressurized media, an indication can be obtained that the outer locking position has been assumed due to the presence of leakage of pressurized media, and wherein the casing surface of one of the coupling parts exhibits a leakage groove which runs at an acute angle (v) towards a radial plane of the coupling part the leakage groove having an axial inner end and an axial outer end, and is so positioned that in the inner locking position the leakage groove is positioned axially outside of the sealing member and in the outer locking position the axial inner end of the leakage groove is positioned axially inside of the sealing member and the axial outer end of the leakage groove is positioned axially outside of the sealing member by means of which pressurized media can pass by the sealing member wherein the leakage groove consists of a spiral-shaped groove.

2. The coupling device as recited claim 1, wherein the leakage indication consists of an audible leakage sound.

3. The coupling device as recited in claim 1, wherein the leakage groove is arranged in a radially inward facing casing surface of the female part and the sealing member consists of a sealing ring arranged in a radially outward facing casing surface of the male part.

4. The coupling device as recited in claim 3, wherein the female part, in the casing surface axially outside of the leakage groove, exhibits a conical wall and the male part exhibits, axially outside of said sealing ring, a second sealing ring that in the inner locking position is in sealing contact with the conical wall, and in the outer locking position leaves free passage for pressurized media via a ring shaped gap between the sealing ring and the conical wall.

5. A coupling device for conduits of pressurized media, said coupling device comprising: two coupling parts, each having a casing surface, couplable together as a female part (1) and a male part (2) which is insertable into the female part; a locking device arranged to allow coupling of the male part with the female part and to, in an inner locking position, hold the coupling parts coupled together, the locking device comprises at least one locking member at one of the coupling parts that is arranged to, in said locking position, attach into a recess in the other coupling part with one or several sealing members being arranged to, in said locking position, achieve sealing engagement between the coupling parts, with the second coupling part having a further recess in which said locking member is brought into locking engagement of the coupling parts in an outer locking position at the coupling of the two coupling parts with each other, and in which outer locking position an incomplete sealing is achieved and in which the two coupling parts are locked and incompletely coupled together and thereby being prevented from coming apart and being allowed to be brought together to said inner locking position for a complete coupling of the coupling parts by means of which, in the presence of a pressurized media, an indication can be obtained that the outer locking position has been assumed due to the presence of leakage of pressurized media, and wherein the casing surface of one of the coupling parts exhibits a spiral-shaped leakage groove which runs at an acute angle (v) towards a radial plane of the coupling part the leakage groove having an axial inner end and an axial outer end, and is so positioned that in the inner locking position the leakage groove is positioned axially outside of the sealing member and in the outer locking position the axial inner end of the leakage groove is positioned axially inside of the sealing member and the axial outer end of the leakage groove is positioned axially outside of the sealing member by means of which pressurized media can pass by the sealing member.

6. The coupling device as recited in claim 5, wherein a leakage indication consists of an audible leakage sound.

7. The coupling device as recited in claim 5, wherein the leakage groove is arranged in a radially inward facing casing surface of the female part and the sealing member consists of a sealing ring arranged in a radially outward facing casing surface of the male part.

8. The coupling device as recited in claim 7, wherein the female part, in the casing surface axially outside of the leakage groove, exhibits a conical wall and the male part exhibits, axially outside of said sealing ring, a second sealing ring that in the inner locking position is in sealing contact with the conical wall, and in the outer locking position leaves free passage for pressurized media via a ring shaped gap between the sealing ring and the conical wall.

* * * * *